United States Patent [19]

Murao

[11] Patent Number: 4,474,525
[45] Date of Patent: Oct. 2, 1984

[54] YARN PACKAGE STORAGE APPARATUS

[75] Inventor: Yoshio Murao, Kanazawa, Japan

[73] Assignee: Murao Boki Kabushiki Kaisha, Kanazawa, Japan

[21] Appl. No.: 351,209

[22] Filed: Feb. 22, 1982

[30] Foreign Application Priority Data

Oct. 19, 1981 [JP] Japan ................. 56-167614

[51] Int. Cl.³ ............................................ B65G 47/06
[52] U.S. Cl. .................................. 414/331; 414/779; 414/782
[58] Field of Search ............... 414/282, 331, 779, 782, 414/783, 911; 198/412; 242/35.5 A

[56] References Cited

U.S. PATENT DOCUMENTS 3,902,615 9/1975 Levy et al. .................. 414/331
3,924,762 12/1975 Igel ............................ 414/331

FOREIGN PATENT DOCUMENTS 43-20647 9/1968 Japan .
52-95472 8/1977 Japan .
53-42808 11/1978 Japan .
54-88575 7/1979 Japan .

Primary Examiner—Robert G. Sheridan
Attorney, Agent, or Firm—Oblon, Fisher, Spivak, McClelland & Maier

[57] ABSTRACT

The present invention relates to the construction of a storage apparatus for temporarily storing a large number of yarn packages (yarn wound on cones or taper cones). The storage apparatus is so arranged that many yarn packages automatically aligned are accommodated in a small space so as to be readily taken out when required, while, for the storing, the large number of yarn packages fed thereinto are aligned on conveyers narrow in width in the direction of take-up axis, and through utilization of a yarn package holding frame which is adapted to be raised while simultaneously holding opposite sides of the yarn packages thus aligned, said holding frame is lowered during taking out of the yarn packages so as to leave the yarn packages held thereby on the conveyers, as the holding frame being further lowered.

3 Claims, 13 Drawing Figures

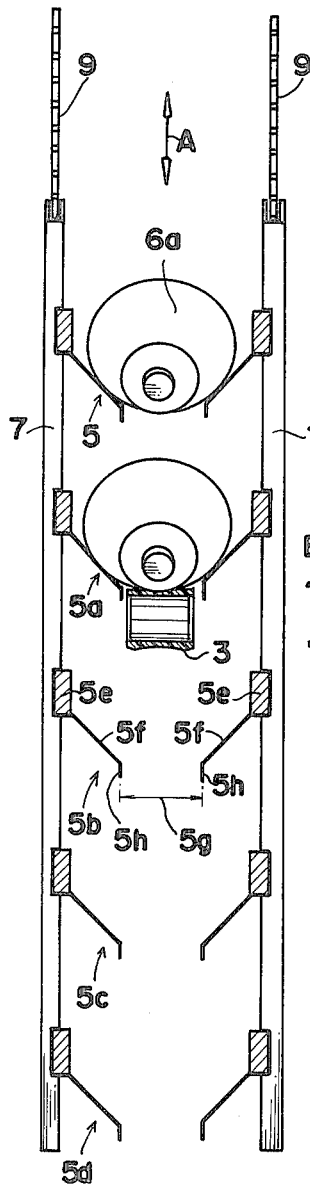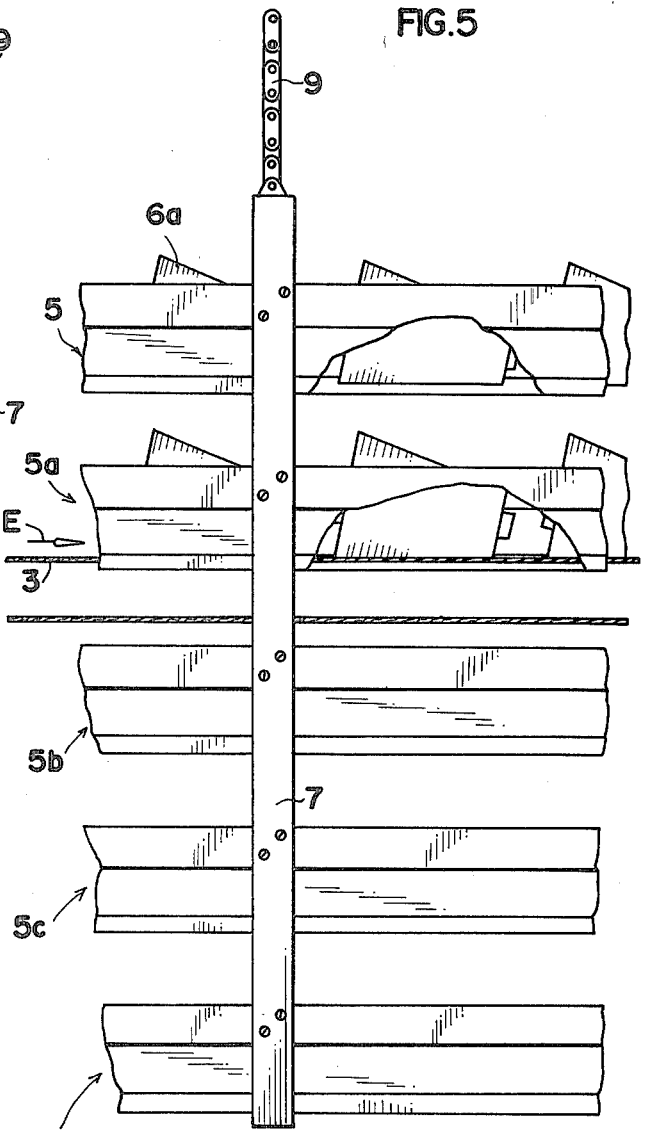

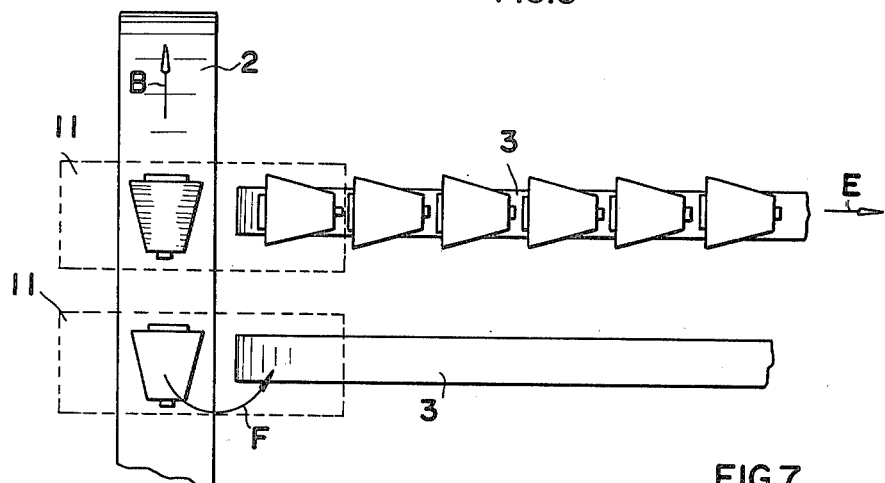
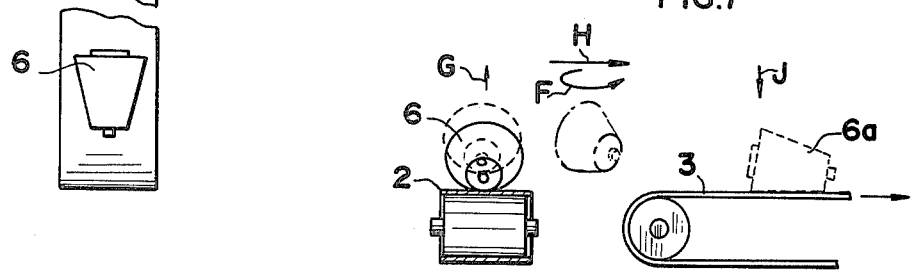
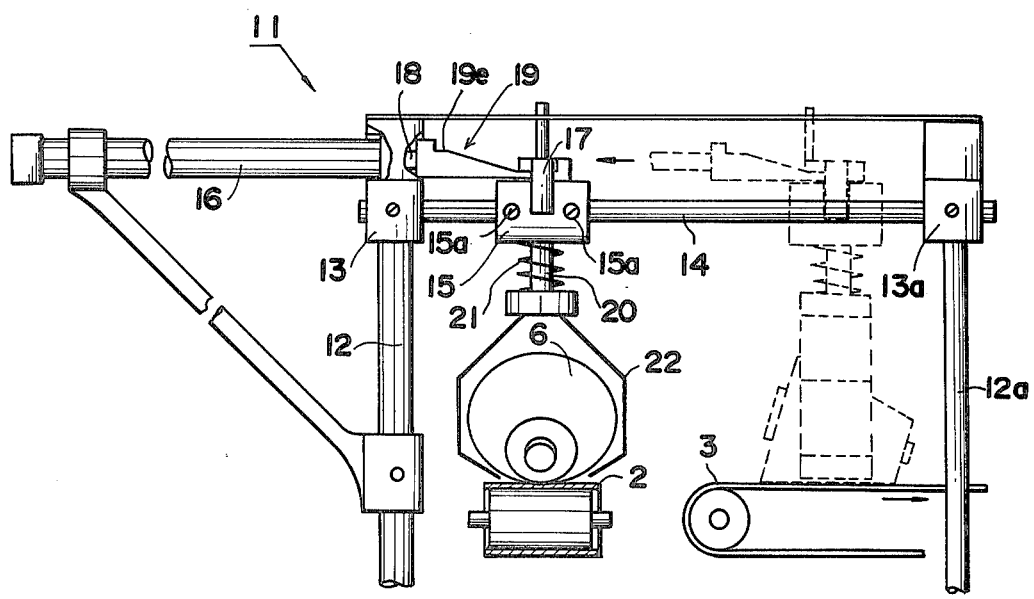

YARN PACKAGE STORAGE APPARATUS

BACKGROUND OF THE INVENTION

Generally, yarn packages formed by winders are transported as they are to subsequent processes or packing process through various transporting means and necessary processes. However, since there is a case where all of the yarn packages produced can not necessarily be treated, depending on the operations at the treating processes and working efficiency at the packing process, etc., it is so arranged, in some cases, that the yarn packages produced by winders are temporarily stored for being taken out when required for the processings and packing.

On the other hand, for storing the yarn packages, it has been a common practice to leave the yarn packages in a specified place, with such packages being packed in a bogie truck for transportation thereof or to store them in a storage section formed at one part of an automatic transport conveyer, or in some cases, to store these yarn packages on the transport conveyers by stopping such conveyers, thus often resulting in such disadvantages that configurations of the yarn packages are deformed or surfaces thereof are undesirably soiled. In order to eliminate the inconvenience as described above, it has been desired to provide such an apparatus as will automatically transport yarn packages produced by the winders and temporarily accommodate and store them by taking into account the demand at the subsequent processes, and moreover, be capable of regularly align many yarn packages in a small space so as to be readily taken out simultaneously.

Accordingly, an essential object of the present invention is to provide a yarn package storage apparatus that will fully satisfy the requirements as described above.

SUMMARY OF THE INVENTION

According to one preferred embodiment of the present invention, there is provided a yarn package storage apparatus which is so arranged that, by disposing, at a predetermined height, storage conveyers each having a width smaller than the diameter of the yarn package and extending over a comparatively long length, the yarn packages produced by winders are arranged on each storage conveyer at approximately a constant interval as they are aligned with respect to the winding axis thereof, and a plurality of stages of storage rails which are raised for passing by holding the storage conveyers in the longitudinal direction are provided, so as to simultaneously lift the yarn packages on the storage conveyers during the passing, while a yarn package supply conveyer and a yarn package take-out conveyer are respectively provided at opposite sides of the storage conveyer, with a transfer device for turning the yarn packages through 90° being incorporated at a yarn package delivery section of the above conveyers and said storage conveyers.

BRIEF DESCRIPTION OF THE DRAWINGS

Hereinbelow, the present invention will be described in detail with reference to the accompanying drawings.

It is to be noted here that the attached drawings show one preferred embodiment of the present invention, and the present invention is not limited to the embodiment as illustrated therein, but may be modified or varied in part in its construction and design within the scope.

It should also be noted that in the embodiment to be described hereinbelow, the yarn package is illustrated in the form of a tapered cheese.

Figure 1:
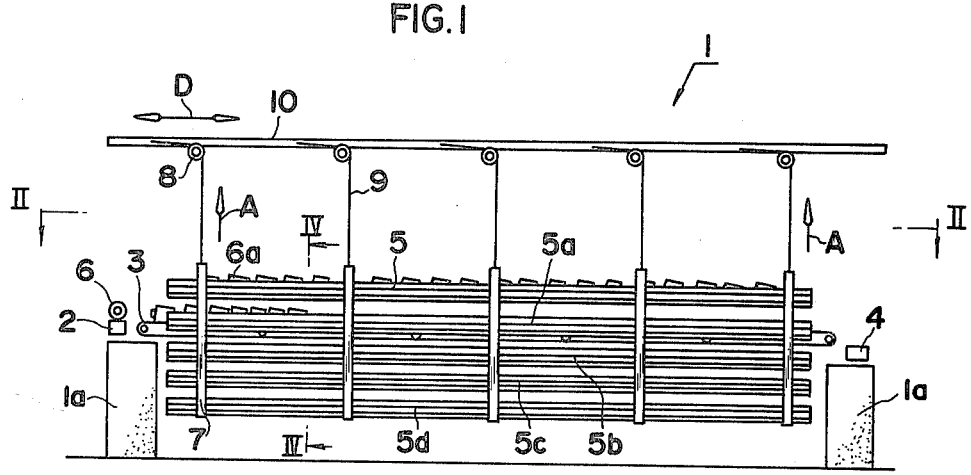
Figure 2:
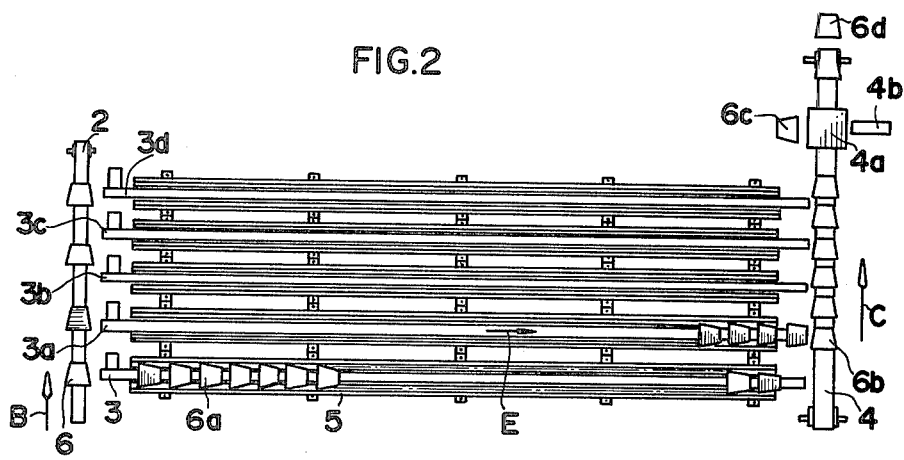
Figure 3:
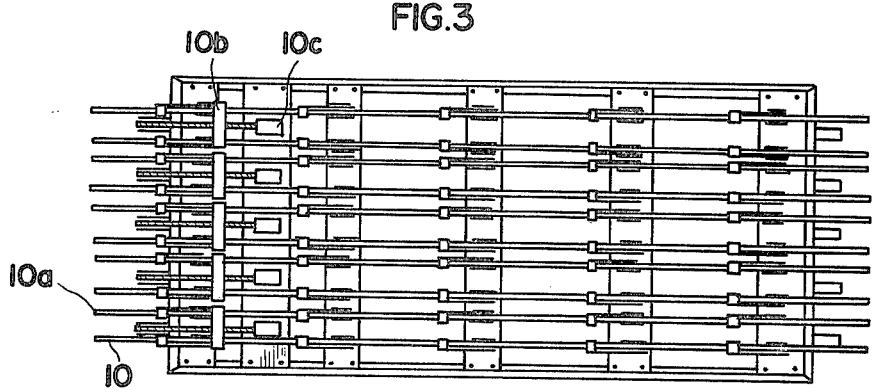

FIGS. 1 through 5 are schematic diagrams explanatory of a yarn package storage apparatus (cheese stocker) according to one preferred embodiment of the present invention, in which;

FIG. 1 is a schematic side elevational view of the yarn package storage apparatus, FIG. 2 is a cross section taken along the line II—II in FIG. 1, FIG. 3 is a top plan view of the apparatus of FIG. 1, FIG. 4 is a cross section, on an enlarged scale, taken along the line IV—IV in FIG. 1, and FIG. 5 is a side elevational view of the portion of FIG. 4.

Figure 9:
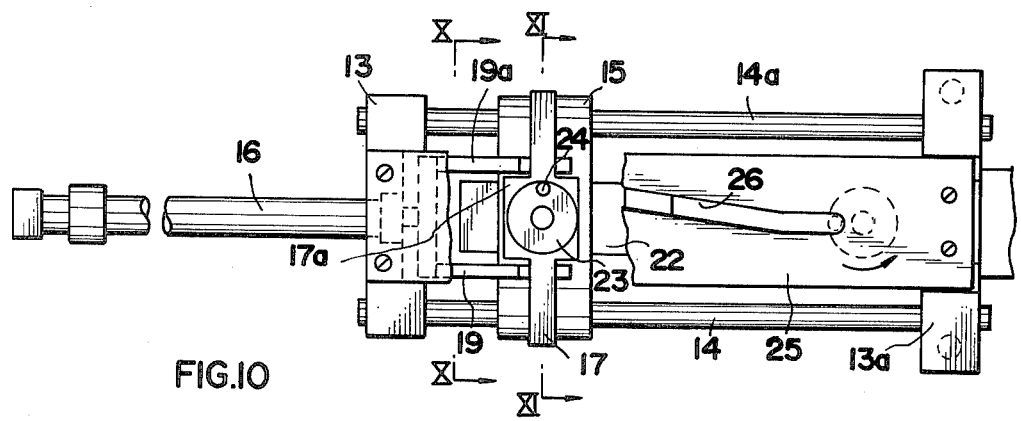
Figure 10:
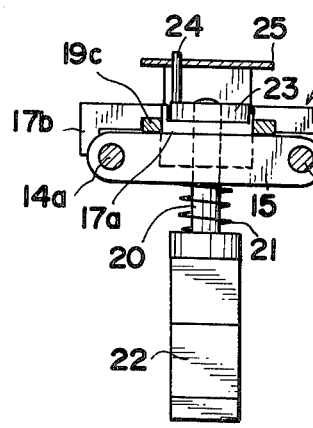
Figure 11:
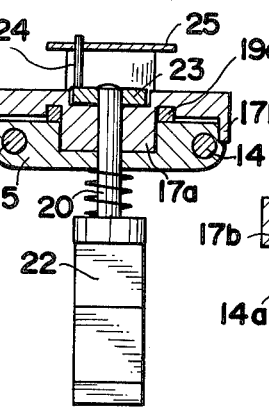
Figure 12:
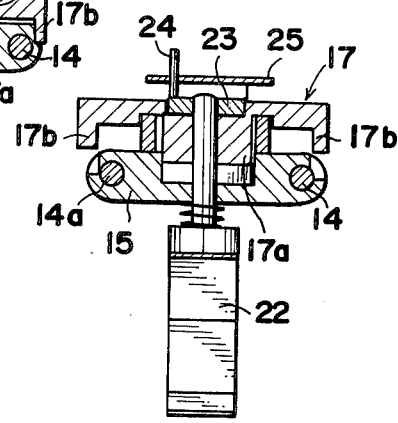
Figure 13:
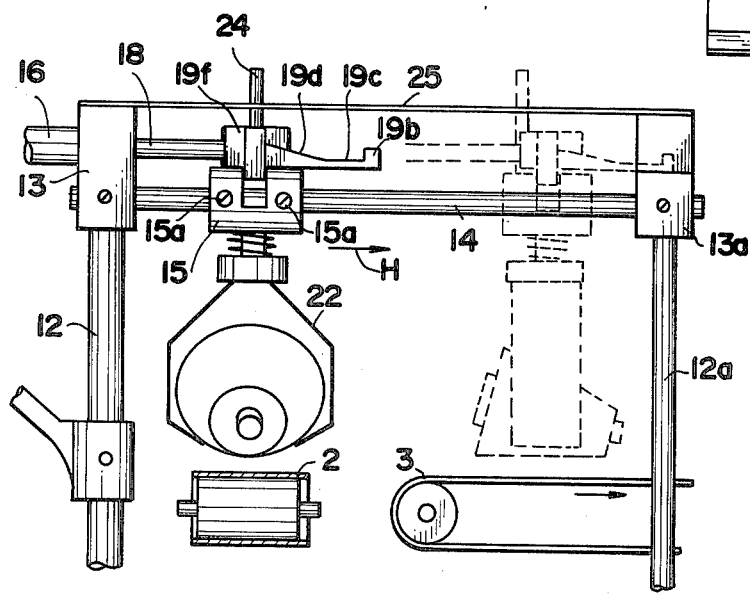

FIGS. 6 through 13 show one example of a cheese transfer device to be incorporated into the apparatus according to the present invention, in which;

FIG. 6 is a schematic diagram explanatory of installation thereof,

FIG. 7 is a fragmentary diagram explanatory of functioning thereof,

FIG. 8 is a side elevational view of the device,

FIG. 9 is a top plan view thereof,

FIG. 10 and 11 are cross sections taken along the lines X—X and XI—XI of FIG. 9, and FIGS. 12 and 13 are diagrams explanatory of functions thereof.

DETAILED DESCRIPTION OF THE INVENTION

Referring now to the drawings, there is shown a cheese stocker 1 which includes a cheese supply conveyer 2 and a cheese take-out conveyer 4 mounted on fixed bases 1a and 1a provided at opposite sides of the cheese stocker 1, and storage conveyers 3, 3a, 3b, 3c and 3d arranged in positions extending between said conveyers 2 and 4. The storage conveyers 3 are adapted to be moved in the direction of an arrow E (FIG. 2) by driving means individually provided, and such movement of the storage conveyers 3 may be classified into the accommodating movement during storing of cheeses and discharging movement during taking-out of the cheeses. In the drawings, the cheese stocker 1 is illustrated, as a laterally five row and vertically five stage type, in which the storage conveyers 3 include the group or set of conveyers 3a, 3b, 3c and 3d arranged in approximately the same plane, with the supply conveyer 2 and take-out conveyer 4 corresponding to the respective storage conveyers.

Meanwhile, in correspondence to each of the storage conveyers 3, there is provided a set of storage rails composed of five rows of rails 5, 5a, 5b, 5c and 5d, each of which is secured to a plurality of suspension bars 7. To the upper end of each suspension bar 7, one end of a chain 9 is fixed, while the other end of the chain 9 is connected to a corresponding portion of a moving rod 10 through a pulley 8 rotatably supported by an upper portion of an apparatus frame. It is to be noted that two moving rods 10 and 10a, (FIG. 3) are respectively provided at the left and right sides (in the direction of movement of the cheeses) with respect to each one set of the storage rails 5, and are connected to each other by connecting members 10b provided on the upper portion of the frame so as to be displaced in the direction of an arrow D (FIG. 1), with the rods of the left and right sides moving in one unit, and by this movement, the storage rails 5 are raised as shown by an arrow A (FIG. 1) or lowered.

On the other hand, each of the storage rails 5 includes beam members 5e and 5e for both sides and inclined plates 5f and 5f attached to the lower sides of said beam members 5e and 5e, while bent or folded portions 5h and 5h are formed at the lower edges of the respective inclined plates 5f and 5f so as to extend downwardly approximately perpendicularly, with the interval 5g between the bent portions 5h and 5h being set to be larger than a lateral width of the storage conveyer 3. It is to be noted here that, for the storage conveyer 3, the conveyer having a lateral width smaller than the wound up diameter of the cheese to be stored is utilized, and that said interval 5g of the storage rail 5 as described above is also formed to be narrower than the wound up diameter of the cheese.

In the apparatus having the construction as described above, the cheeses 6 placed on the supply conveyer 2 at a predetermined interval or at any interval as desired are displaced in the direction of the arrow B (FIG. 2), and are turned around while being rolled, by the transfer device referred to earlier and provided to correspond to the storage conveyer 3 so as to be transferred onto the storage conveyer 3. Meanwhile, the storage conveyer 3 is arranged to be rotated by one pitch in the direction of an arrow E every time the cheese 6 is transferred, and to be stopped when the cheeses are placed thereon over the entire length, and by the above stopping, the storage rails 5 are simultaneously raised by one pitch this time. More specifically, in the drawing, there is shown the state where the storage rail 5 at the uppermost stage has already been raised, with the cheeses 6 stored thereon, while the storage rail 5a at the second stage is stopped to correspond to the storage conveyer 3 for storage and supply. The rising by one pitch as described above is a distance for the storage rail 5b to move to the position of 5a. In the manner as described in the foregoing, cheeses are stored at each stage during rising, and for taking out of the cheeses, the lowermost rail is stopped at the position corresponding to the storage conveyer 3 so that the stored cheeses are supported by the storage conveyer 3, and by the driving of the storage conveyer 3, individual cheeses are transferred onto the take-out conveyer 4. For such transfer also, the cheeses are turned around through 90° by the guide member as described earlier. It is recommended that the above take-out conveyer 4 is provided with an insufficient weight checker 4a for weighing of the cheeses for removal of fauty cheeses 6c by a push-out device 4b so as to take out only the cheeses 6d having the specified weight.

Referring now to FIGS. 6 through 13, one example of a cheese transfer device to be incorporated into the arrangement of the present invention will be described hereinbelow.

As shown in FIG. 6, the cheese transfer device 11 is provided at the cheese delivery section between the cheese supply conveyer 2 and the storage conveyer 3, and in the drawing, there is shown the device which is so arranged that the mounted cheeses 6 are transported by the supply conveyer 2 in the direction opposite to that in the case of FIG. 2, and which is provided to correspond to each of the storage conveyers 3. In the above arrangement, the cheeses 6 to be supplied are turned around as shown by an arrow F for the displacement, while, for the above displacement, the cheeses 6 on the supply conveyer are raised for movement as indicated by an arrow G so as to be released from contact thereof with the conveyer 2, and in the state as they are raised, turned around during movement thereof as shown by an arrow H onto the storage conveyer, so that the cheeses are lowered for transfer onto the storage conveyer 3 as indicated by an arrow J, with such functions as described above being arranged to be effected in association with each other. In FIG. 8 showing a side elevational view of this device on the whole, two guide rods 14 and 14a are provided to extend over the upper portion of the cheese transfer section between the supply conveyer 2 and the storage conveyer 3, and these rods 14 and 14a are respectively secured to brackets 13 and 13a mounted on the upper ends of stay stands 12 erected at the side of the supply conveyer 2 and stay stands 12a and 12a erected at opposite sides of the storage conveyer 3. Meanwhile, a moving seat 15 is slidably mounted on said guide rods 14 and 14a so as to provide a proper friction between the moving seat 15 and the guide rods 14 by frictional braking devices 15a and 15a which are each formed by inserting brake shoe pieces disposed at forward ends of coil springs into corresponding threaded openings for pressure adjustments by cap nuts. It is to be noted, however, that the braking devices as described above may be replaced by other breaking means. On the other hand, at the side of the bracket 13, an operating cylinder 16 is mounted, with engaging levers 19 which are mounted on a piston 18 of the cylinder 16 being associated with the moving seat 15, so that, upon retraction of the piston 18, the moving seat 15 is located immediately above the supply conveyer 2, while, upon protrusion of the piston 18, said moving seat 15 is positioned directly above the cheese mounting section of the storage conveyer 3 as indicated by chain lines.

Meanwhile, as shown in FIGS. 10 and 11, the moving seat 15 is provided with an elevating seat 17, which is formed with a square base portion 17a at its control portion and edge portions 17b and 17b at opposite sides thereof for being fitted into corresponding recesses formed at the side of the moving seat 15. Although the construction as described above is recommendable, the arrangement may be so modified that the elevating seat 17 is arranged to be raised or lowered by other structures. Moreover, a shaft 20 is rotatably provided to extend through the central portion of the elevating seat 17, while a cheese holding frame 22 is secured to the lower side of said shaft 20, with a disc 23 being fixed to the upper end of the shaft 20 as shown. Furthermore, around the shaft 20 at its portion between the cheese holding frame 22 and the moving seat 15, a coil spring 21 is disposed for urging the cheese holding frame 22 to project downwardly and for braking the shaft 20 against its rotation, and at the upper surface of the disc 23, an operating lever 24 is mounted. In the moving seat 15 having the construction as described above, the cheese holding frame 22 is supported by the shaft 20 in a suspended manner, while said frame 22 is raised by compressing the coil spring 21 through the upward movement of the elevating seat 17, with simultaneous rotation in any direction as desired through rotation of the disc 23. The operating lever 24 for the disc 23 is fitted into a guide groove 26 formed in a guide plate 25 which is mounted at the top portions of the brackets 13 and 13a directly and through a block member, and as shown in part in FIG. 9, the above guide groove 26 is so inclind that, when the moving seat 15 is located above the supply conveyer 2, the open side of the cheese support frame 22 is positioned in parallel with said conveyer 2, and upon displacement onto the storage conveyer 3, the operating lever 24 is rotated by ¼ for turning around the cheese support frame 22 through 90°. In other words, the disc 23 is rotated in the direction of the arrow as it is moved toward the position indicated by the dotted lines, with the rotation being smooth and at a constant speed by the presence of the guide groove 26.

On the other hand, for the raising or lowering of the elevating seat 17, it may be so arranged that a small-sized operating cylinder is provided between the elevating seat 17 and moving seat 15 for operation, or that the raising or lowering may be effected by the functioning of a strong magnet, etc., but an arrangement for conducting the raising or lowering in association with the functioning of the elevating seat 17 is favorable, and therefore, the arrangement constructed in such a manner is illustrated in the drawings. More specifically, the engaging lever 19 to be attached to the forward end of the piston 18 earlier described is formed into a wedge-piece shape, and during the transfer of the cheeses, the moving seat 15 is displaced after pushing up of the elevating seat 17, so that, during restoration, the moving seat 15 is returned by lowering the elevating seat 17. For this purpose, as shown in FIG. 9, the engaging lever 19 is formed into bifurcated levers 19 and 19a of the wedge-piece configuration, and includes a forward end engaging portion 19b, a low stepped portion 19c, an inclined portion 19d, a high stepped portion 19e (FIG. 8) and a rear end engaging portion 19f as is most clearly seen in FIG. 13, while said engaging lever 19 is inserted into the edge root portion of the elevating seat 17 for supporting said elevating seat 17. Accordingly, at the position indicated by the solid lines (Stand-by position) in FIG. 8, the elevating seat 17 as it is in the restored state, is supported by the low stepped portion 19c of the engaging lever 19 so as to be lowered. Subsequently, upon arrival of the supplied cheese 6 into the cheese support frame 22, the operating cylinder is actuated by a detecting means separately provided. By the above actuation, as shown in FIG. 13, the inclined portion 19d of the engaging lever 19 first raises the elevating seat 17, and at the high stepped portion 19e, the seat 17 is displaced in the direction of the arrow H by the rear end engaging portion 19f, whereby the moving seat 15 can be moved to the position indicated by the dotted lines. Subsequently, upon restoring functioning of the engaging lever 19, the elevating seat 17 is first lowered in a manner contrary to that earlier described, and by the forward end engaging portion 19b, the moving seat 15 is displaced for restoration through the elevating seat 17 as indicated by the dotted lines in FIG. 8.

Meanwhile, for the cheese holding frame 22, a frame constituted by a polygonal frame formed with an open groove at its lower side as illustrated may be preferable, but the configurations of the frame are not particularly limited, but may be of of circular or elliptic shape formed with the open groove or of any configuration so far as it is arranged that the cheeses are fed-in from its open groove portion at the stand-by position above the supply conveyer 2, and such cheeses can be displaced onto the supply conveyer 2 for retreatment by the rising of the support frame 22. Similarly, the frame should of course have such a configuration that in the state where it is lowered onto the storage conveyer 3, the supported cheese is placed on said conveyer 3 for smooth slipping off from the holding frame 22.

As is clear from the foregoing description, according to the yarn package storage apparatus of the present invention constructed as above, since the undesirable rubbing of the outer surface yarn layer of the cheese against the conveyer or guide and regulating members is completely eliminated, there is no possibility of damaging the cheese. Furthermore, owing to the fact that the smooth transfer of cheeses has been made possible through simple construction, the transfer can be rationalized not only in the cheese stocker, but also in other cheese processing apparatuses.

What is claimed is:

1. A yarn package storage apparatus for temporarily storing a large number of yarn packages so as to permit removal of said yarn packages when required, said apparatus comprising a yarn package elevating device including storage conveyers each provided at a fixed predetermined height and formed to extend approximately horizontally over a long length, with a width smaller than a diameter of the yarn package so as to permit placing thereon the yarn packages at a predetermined interval, and storage rails confronting each other with said conveyers being held therebetween in the longitudinal direction for simultaneously raising the yarn packages supported on the conveyers, said storage rails being provided in a plurality of stages on elevating suspension rods to comprise said yarn package elevating device, and a yarn package supply conveyer and yarn package take-out conveyer which are approximately horizontal and are provided at a yarn package supply side and a yarn package take-out side of said storage conveyors so as to respectively intersect at right angles with the storage conveyers, and a yarn package transfer device provided among said supply conveyer and said take-out conveyer and said storage conveyers so as to turn the respective yarn packages through 90°.

2. A yarn package storage apparatus as claimed in claim 1, wherein said yarn package transfer device further comprises a moving seat which is displaced for reciprocation over the upper portion of a yarn package delivery section, and a yarn package support frame formed with a gap which does not allow the yarn package to pass therethrough at its lower side, and provided at the under side of said moving seat for rotation and raising or lowering as desired, the yarn packages standing-by on the supply conveyer or storage conveyer being arranged to be raised and displaced after having been received by said yarn package support frame so as to subsequently lower said yarn package support frame for restoring the moving seat, with said yarn package support frame being turned around through 90° following said reciprocating movement.

3. A yarn package storage apparatus as claimed in claim 2, wherein said yarn package support frame is rotatably provided on an elevating seat mounted for being raised or lowered as desired with respect to the moving seat so as to be raised by a stepped wedge-shaped lever provided at the forward end of a moving seat reciprocating operating piston and also to be moved onto the conveyer at the opposite side accompanied by said moving seat.

* * * * *